United States Patent [19]
Chung et al.

[11] Patent Number: 5,696,319
[45] Date of Patent: Dec. 9, 1997

[54] FLEXURE FIXTURE FOR DYNAMIC LOADING MODAL SURVEYS OF TEST ARTICLES

[75] Inventors: Yung-Tseng Chung, Cerritos; Walter Tsui, Huntington Beach, both of Calif.

[73] Assignee: McDonnell Douglas Corporation, Huntington Beach, Calif.

[21] Appl. No.: 708,996

[22] Filed: Sep. 6, 1996

[51] Int. Cl.$^6$ .................................................. G01M 9/00
[52] U.S. Cl. .................................................. 73/147
[58] Field of Search .................... 73/147, 1 B, 65.05, 73/865.3; 244/1, 158

[56] References Cited

U.S. PATENT DOCUMENTS

| | | | |
|---|---|---|---|
| 2,711,648 | 6/1955 | Carlstrand et al. | 73/147 |
| 3,597,960 | 8/1971 | Otera | 73/12 |
| 3,815,849 | 6/1974 | Davidson | 244/1 |
| 4,408,740 | 10/1983 | Kleber | 244/158 |
| 5,020,357 | 6/1991 | Kovacevic | 73/1 |
| 5,020,364 | 6/1991 | Manitt et al. | 73/147 |
| 5,038,604 | 8/1991 | Rullet | 73/65 |
| 5,197,341 | 3/1993 | Steeves | 73/865.3 |
| 5,279,144 | 1/1994 | Levkowitch | 73/147 |
| 5,345,818 | 9/1994 | Magill et al. | 73/147 |

OTHER PUBLICATIONS

Paper presented International Modal Analysis Conference, Florida Jan. 1995 by X.I. Chung & R.C. Abercrombie.

*Primary Examiner*—George M. Dombroske
*Assistant Examiner*—William L. Oen
*Attorney, Agent, or Firm*—The Bell Seltzer Intellectual Property Group of Alston & Bird LLP

[57] ABSTRACT

A modal survey flexure fixture of designed to be soft laterally and stiff axially to simulate the same behavior of space shuttle flight latches which support shuttle payloads for payload modal survey verification, qualification and test. The device consists of three major components: an A-Frame which supports flexure rods attached to a trunnion clamp. Flexure rods made of stainless steel with a partially reduced cross section at both ends increase the lateral flexibility for simulating flight conditions. The trunnion clamp is a unique design which takes into account payload integration with the test fixture. The trunnion clamp can be split into upper and lower portions. During the modal survey the lower trunnion clamp acts initially as a place holder for payload installation and alignment. After payload installation and alignment the lower trunnion clamp is combined with the upper trunnion clamp to complete the test fixture configuration.

7 Claims, 3 Drawing Sheets

FLEXURE FIXTURE FOR DYNAMIC LOADING MODAL SURVEYS OF TEST ARTICLES

BACKGROUND OF THE INVENTION

1. Field of the Invention

The field of this invention relates to devices and fixtures used to dynamically test various payloads. More specifically this invention relates to fixtures used to dynamically test Space Shuttle payload for liftoff and landing dynamic loads, including verification and correlation with mathematical data.

2. Related Art

Mathematical models of Space Shuttle payloads which are used to compute the liftoff and landing dynamic loads of the Shuttle are required to be dynamically test-verified to correlate with the test data.

Traditional fixed-base dynamic test which is designed to match the actual flight conditions, usually generates considerable difficulties and expense in test. The major problem is the non-linear behavior of the shuttle/payload interfaces (trunnions). Past dynamic test experience indicates that some trunnions slip when the amplitude of the excitation level is increased while the others do not. In other words, trunnion slippage in these test conditions is mode dependent and the boundary conditions between modes vary. Consequently, a test-verified model needs to be generated and analyzed for each non-linear mode to be used for predicting accurate dynamic loads in the corresponding frequency bandwidth. This non-linear behavior makes the analytical model adjustment and dynamic loads prediction a tedious task and subject to error and possible misinterpretation.

Other alternatives such as free-free test conditions and the fixed-fixed test conditions have been used in the aerospace industry for test verification, however, all of these approaches have drawbacks such as contamination of test data due to the coupling of the test article and the test fixture in the samples. This causes difficulty in simulating the exciting of the significant modes for the flight environments, and the cost and verification of the test fixture. The modal survey flexure fixture of the instant invention overcomes all of these difficulties for better simulation of the space shuttle payload flight conditions and the test analysis model correlation.

BRIEF DESCRIPTION OF THE INVENTION

The modal survey flexure fixture of the instant invention is designed to be soft laterally and stiff axially to simulate the same behavior of space shuttle flight latches for payload modal survey verification, qualification and test. This flexure fixture device consists of three major components: an A-Frame, flexure rods and a trunnion clamp.

The key component of this device is the flexure rod which is made of 17-4 PH stainless steel with a reduced cross section at both ends in order to increase the lateral flexibility for simulating the flight conditions. The non-linear behavior caused by the slippage of the shuttle trunnion is also greatly minimized by the instant invention. Another advantage of this design is the flexure rods for the primary and secondary trunnions are always under tension statically, therefore it can support all classes of payloads carried by the space shuttle and concern for structural buckling failure within the test fixture are eliminated.

The trunnion clamp is a unique design which takes into account payload integration with the test fixture. The clamp can be split into upper and lower portions. During the installation the lower trunnion clamp acts as a place holder and alignment tool for payload. After payload installation and alignment the lower trunnion clamp is combined with the upper trunnion clamp to complete the test fixture configuration. Accordingly, the payload installation process using the instant invention is greatly simplified over that of the free-free fixture or the fixed-fixed fixture. In addition, the modal flexure fixture structure of the instant invention has greater load carrying capability and structural integrity than compressive flexure designs.

PREFERRED EMBODIMENT(S)

Figure 1:
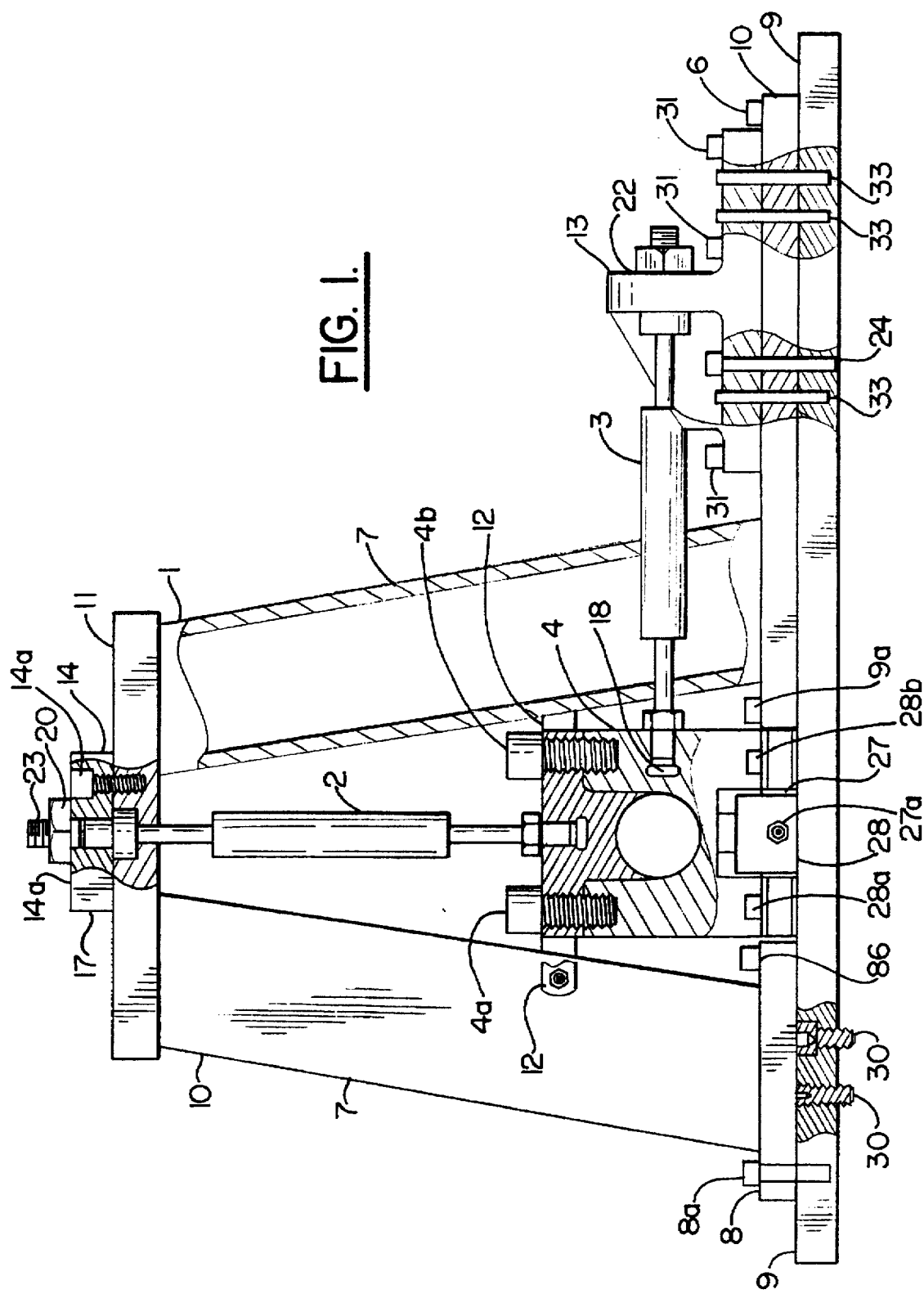
FIG. 1 is a side view of the flexure fixture.
Figure 2:
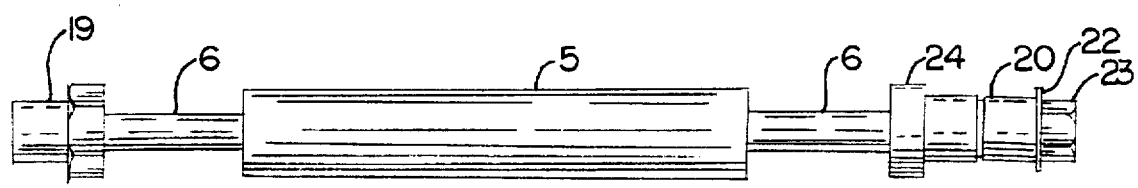
FIG. 2 is a side view of the flexure rod construction.

As shown in FIG. 1, the modal survey flexure fixture device consists of three major components: an A-Frame 1, flexure rods 2 and 3 and a trunnion clamp 4. The flexure rods 2 and 3 are made of 17-4 PH stainless steel as shown in FIG. 2. The flexure rods have a center section 5 and end sections 6 with a reduced diameter cross section at both ends in order to increase the lateral flexibility for simulating the flight conditions. The specific length and diameter of such reduced cross section is dependent on the specific load to be introduced.

Figure 3:
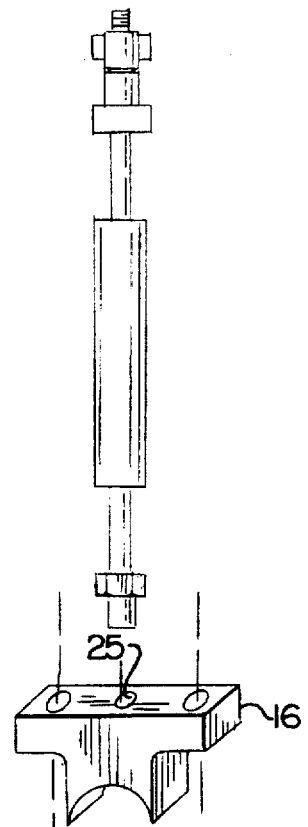
FIG. 3 is an exploded view of the trunnion clamp.
Figure 4:
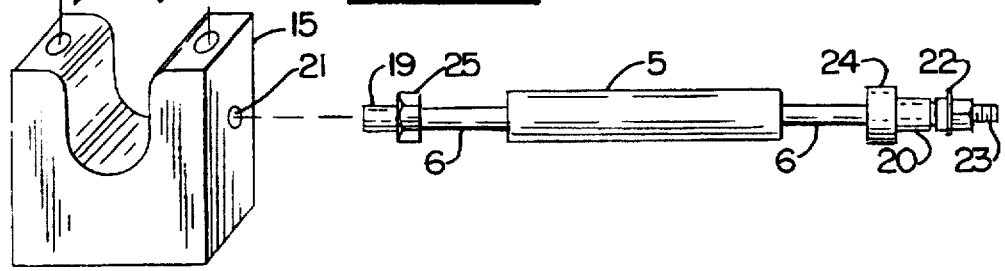
FIG. 4 is a side view of the pillow block.
Figure 4:
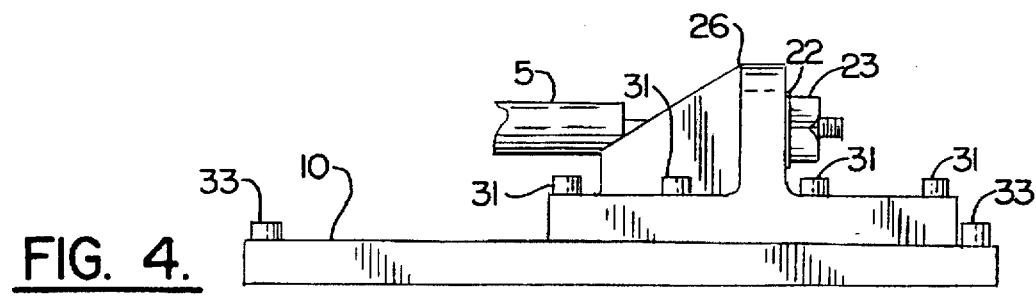
Figure 5:
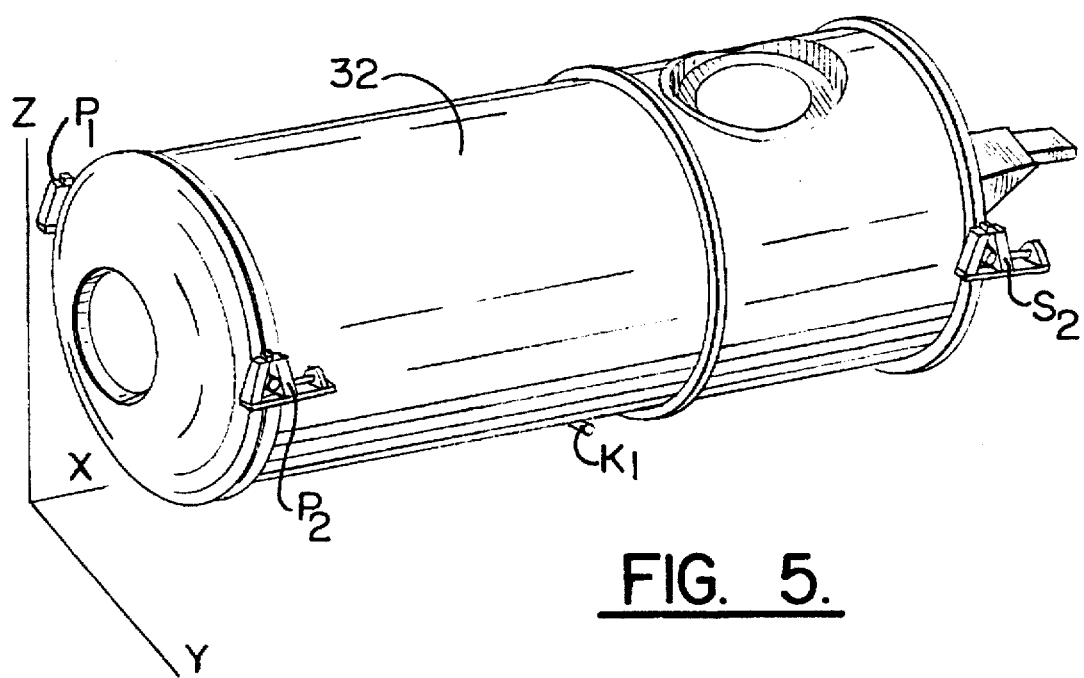
FIG. 5 is a perspective view of the payload supported by a plurality of flexure fixtures.

Further with respect to FIG. 1, the A-frame support structure includes a pair of 15.228×15.228×1.269 cm (6"× 6"×½") square tube steel supports or arms 7 having the greater dimension in the plane of FIG. 1. Such arms 7 are attached at the top with a top support member 11, such that the arms 7 form an angle with the base. The arms 7 are welded in a fixed manner to the base plate 8 and the pillow block support 10. The base plate 8 and the pillow block support 10 are in turn mounted on an adapter plate 9 as shown in FIG. 1 by screws 8a and 8b and 9a and 9b respectively. The adaptor plate is selected based upon the test fixture desired and is attached to a floor or other solid surface through a series of allen screws and dowel pins 30 not all of which are show. The A-frame 1 is used to support the vertical flexure rod 2 and the pillow block 10 is used to support the horizontal flexure rod 3. A hole may be provided in one of the support arms 7 to permit clearance of the flexure rod 3 through such hole in order to permit attachment to the trunnion clamp 4 and the pillow block 13. The cap 14 at the top of the A-frame 1 is attached through allen screws 14a and may be removed to allow easy installation of the vertical flexure rod 2 after the A-frame 1 has been mounted to the test fixture. The A-frame 1 tube is designed to have stiffness at least two orders of magnitude larger than that of the flexure rod to minimize the structural interaction. The adapter plate 9 is removably replaceable to accommodate different trunnion spacing and different test fixture interface design. The flexure rods 2 and 3 are made of 17-4 PH (H900) stainless steel and are heat treated with very high strength (190 ksi). Typically a given payload will be in the range of 4535.97 kg to 15,875.89 kg (10,000 lbs to 35,000 lbs) and a set of five modal flexure fixtures will be used to support the payload. The typical length of the flexure rod is 40.609 cm (16 inches) between the collar 24 and the surface of the trunnion clamp 4 when installed. The center section 5 is 21.574 cm (8.5 inches) in length and machined to 3.173 cm (1.25 inches) in diameter. The reduced diameter cross sections are 6.98 cm (2.75 inches) in length and are machined to 1.523 cn (0.6 inches). All dimensions are to ±0.01269 cm (0.005 inches). The reduced diameter cross section 6 of both ends of the flexure rods 2 and 3 provides higher flexibility to simulate free movement of the space shuttle trunnions during the flight. The non-linearity of the flight latch which can occur during the qualification test is also minimized by using the flexure rods. Since the rods can be flexed by hand, adjustments can be made on installation. The trunnion clamp is shown in detail in FIG. 3 and has upper section 16 and lower section 15 which allow easy installation and integration of the modal survey test article with the test fixture. The design of the modal survey flexure fixture also allows minor manufacturing misalignment of the test article. That is, the holes through which screws or bolts 30 attach the adapter plate to the floor may be drilled slightly oversize to permit translational adjustment to accommodate such misalignment before the installation of the removable dowel pins. The other advantage of the flexure fixture device is that all three trunnion configurations: primary trunnion, secondary trunnion, and keel trunnion, applications can be formed by simply re-arranging the number and the position of the flexure rods in a single flexure fixture assembly design. The primary trunnion configuration utilizes two modal survey flexure fixtures which include both a vertical flexure rod 2 and a horizontal flexure rod 3. The secondary trunnion configuration utilizes two modal survey flexure fixtures which include only a vertical flexure rod 2 each. The keel trunnion configuration utilizes a single modal survey flexure fixture with only a horizontal flexure rod 3 and trunnion clamp 4 with a split bushing. This feature which permits the adaptation of a single survey flexure fixture for multiple positions in a test fixture, greatly reduces the time and the cost for the manufacturing of the modal survey interface fixture and permits ease of use. This arrangement of fixtures is shown in FIG. 5. There are five survey flexure fixture positions, $P_1$, $P_2$ which form the primary flexure fixtures with flexure rods 2 and 3 disposed in the X and Z directions, $S_1$ (not visible), $S_2$ which form the secondary flexure fixtures with flexure rods 2 disposed in the Z direction and $K_1$ (partially visible) which forms the keel flexure fixture with a flexure rod 3 disposed in the Y direction supporting a payload 32. In the case of the keel fixture, the modal flexure fixture may be placed in the horizontal position instead of the vertical position dependent on the disposition of the payload keel trunnion. The modal survey flexure may be used for the modal test of space shuttle trunnion mounted payloads. It can also be modified easily to accommodate payloads launched by other types of launch vehicles due to its flexibility and the ability to use different adaptor plates for the different configurations.

The modal survey flexure fixture described herein is a very unique design. It provides similar flight conditions in the test laboratory to that encountered in the flight of the Shuttle and permits the verifying of the structural dynamic characteristics of the space shuttle payloads as well as an easy integration process for installation of the payload on the test fixture. The use of the 17-4 PH stainless steel rod with reduced cross-section is a key design feature which provides strong stiffness in the axial direction and very soft stiffness in the lateral direction. This simulates shuttle payload flight conditions. The split trunnion clamp concept allows the test payload to be installed to the test fixture at the early stage of the integration process which minimizes potential interference issues after the test fixture has been set up.

The cap 17 at the top of the A-frame as shown in fixture 1 is removable to allow the installation of the vertical flexure rod 2 and tolerates minor misalignment during the installation process. When the payload is attached to the shuttle, for example, motion due to lateral loading is inhibited by friction. In the test fixture, the flexure rods will flex prior to the sliding of the trunnion clamps thereby permitting ease of installation even in the event of minor misalignment.

Each of the flexure rods are essentially identical. The left end 19 of the flexure rod 3 is attached to the trunnion clamp 4 at the lower section 15 through a threaded hole 21. The other end of the flexure rod is inserted into a hole in an upright 26 of the pillow block 13. A threaded male end 23 extends through the hole in the upright 26 and receives a washer 22 and a nut 23. A collar 24 abuts one side of the upright 26 opposite the washer 22 of greater diameter than the hole in the upright 26, and nut 23. When the nut 23 is tightened, the collar 24 is drawn up tight against the upright 26 of the pillow block 13 and the flexure rod 3 is securely fastened in place. The pillow block 13 is fastened to the base plate 10 by allen screws and removable dowel pins 31. Both the pillow block 13 and base plate 10 are fastened to the adaptor plate 9 through removable dowel pins 33 and allen screws 24.

Similarly, the vertical flexure rod 2 is similarly constructed and the male end 19 is received and secured by a thread hole 25 in the upper section 16 of the trunnion clamp 4. The other end of the flexure rod 2 is inserted through a hole in the cap 17. A threaded male end 23 extends from the upper end of rod 2 through the hole in the cap 17 and receives a washer 22 which has a greater diameter than the hole in the cap 17, and a nut 23. A collar 24 abuts one side of the cap 17 opposite the washer 22 and nut 23. When the nut 23 is tightened, the collar 24 is drawn up tight against the cap 17 and the flexure rod 2 is securely fastened in place.

In operation, the trunnions of the payload are placed in the lower section 15 of the trunnion clamp 4. The upper section 16 of the trunnion clamp 4 is placed over the payload trunnion and secured in place by bolting the upper and lower sections of the trunnion clamp together using allen screws 4a and 4b.

The payload is jacked up and the bottom of the trunnion clamp is raised slightly above the adapter plate 9. Links 12 and guides pads 27 are positioned on either side of the trunnion clamp 4 and serve to prevent translation of the trunnion clamp 4 laterally of the trunnion within the fixture.

Guide pads 27 are secured through allen screws 28a and 28b to the adapter plate 9.

Once the payload is in place the weight of the payload places a longitudinal tension on the flexure rod 2 as discussed above. Various modal tests may now be run on the test article and correlation of test data and mathematical models made.

While a specific embodiment has been described, it will be readily apparent to those skilled in the art that other equivalents hereof may be implemented and this invention is not limited to that which is described.

Having thus described the invention what is claimed is:

1. A flexure fixture for engaging a trunnion of a test article during a dynamic loading modal survey of the test article and for simulating the flexural characteristics of a latch which allows slippage of the trunnion along the trunnion axis in actual use, said fixture comprising:

a. a bottom plate, b. a frame supported by said bottom plate and having a predetermined minimum bending stiffness in a direction parallel to the trunnion axis, c. at least one flexure rod having a first end fixedly attached to said frame and an opposite second end extending towards the trunnion, said rod having predetermined bending stiffness in the direction of the trunnion axis less than the bending stiffness of said frame, and d. a trunnion clamp fixedly attached to said second end of said rod adapted for releasably engaging the trunnion of the test article such that said flexure rod flexes in the direction of the trunnion axis relative to said frame in response to dynamic loading of the test article to simulate the slippage of the trunnion in a corresponding latch.

2. A fixture as described in claim 1 wherein said frame further comprises:

a. a plurality of generally upright support arms, b. a cap plate having an opening, receiving at least one flexure rod, and supported on said upright support arms, and c. at lease one base plate fixedly attached to the bottom of the support arms and supported by said bottom plate.

3. A fixture as described in claim 2 wherein there are a plurality of base plates at least one of which is attached to the bottom of each support arm respectively and spaced apart from one another.

4. A fixture as described in claim 2 wherein each of said support arms is a hollow tube disposed at an angle with respect to at least one other support.

5. A fixture as described in claim 2 wherein said fixture further comprises: a plurality of flexure rods coupled to said clamp, at least one of which is anchored to said bottom plate and at least one other of which is disposed into said opening of said cap plate of said frame and removably fastened thereto.

6. A fixture as described in claim 1 wherein said flexure rods further comprise:

a. an elongated central section, and b. end sections which are smaller in cross section than said central section, one of which is adapted for coupling to said clamp.

7. A fixture as described in claim 6 wherein said flexure rods are formed from stainless steel and provide flex in a direction transverse to the central axis of said rods.

* * * * *

UNITED STATES PATENT AND TRADEMARK OFFICE
CERTIFICATE OF CORRECTION

PATENT NO. : 5,696,319
DATED : December 9, 1997
INVENTOR(S) : Chung, et al.

It is certified that error appears in the above-identified patent and that said Letters Patent is hereby corrected as shown below:

Abstract line 1, after "fixture", delete --of--.

Col. 1, line 66, "concern" should be --concerns--.

Col. 2, line 49, "show" should be --shown--.

Col. 3, line 7, "cn" should be --cm--.

Col. 4, line 47, "guides" should be --guide--.

Col. 5, line 7, after "having", insert --a--.

Col. 6, line 7, after "support", insert --arm--.

Signed and Sealed this

Nineteenth Day of May, 1998

Attest:

BRUCE LEHMAN

*Attesting Officer*  *Commissioner of Patents and Trademarks*